(12) United States Patent
Kojima et al.

(10) Patent No.: US 8,297,582 B2
(45) Date of Patent: Oct. 30, 2012

(54) VEHICLE SEAT SLIDING APPARATUS

(75) Inventors: Yasuhiro Kojima, West Bloomfield, MI (US); Hideo Nihonmatsu, Anjo (JP); Yoshihisa Hori, Kakamigahara (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 421 days.

(21) Appl. No.: 12/569,301

(22) Filed: Sep. 29, 2009

(65) Prior Publication Data

US 2010/0090081 A1    Apr. 15, 2010

(30) Foreign Application Priority Data

Oct. 9, 2008   (JP) ................ 2008-263015

(51) Int. Cl.
*F16M 13/00*   (2006.01)
(52) U.S. Cl. .................... 248/424; 297/344.1
(58) Field of Classification Search .......... 248/424, 248/429, 430; 297/344.1, 341
See application file for complete search history.

(56) References Cited

U.S. PATENT DOCUMENTS

| | | | | |
|---|---|---|---|---|
| 6,328,272 B1* | 12/2001 | Hayakawa et al. | ........... | 248/429 |
| 6,341,819 B1 | 1/2002 | Kojima et al. | | |
| 6,585,321 B1* | 7/2003 | Taguchi et al. | ........... | 297/344.1 |
| 6,869,057 B2* | 3/2005 | Matsumoto et al. | ........ | 248/430 |
| 6,945,607 B2* | 9/2005 | Kojima | ........................ | 297/341 |
| 7,328,954 B2* | 2/2008 | Sasaki et al. | ............ | 297/378.12 |
| 7,506,856 B2* | 3/2009 | Ikegaya et al. | ............... | 248/430 |
| 7,963,496 B2* | 6/2011 | Kojima et al. | ............... | 248/429 |
| 2004/0113477 A1 | 6/2004 | Kojima | | |
| 2004/0124683 A1 | 7/2004 | Matsumoto et al. | | |
| 2008/0048476 A1* | 2/2008 | Kojima et al. | ............... | 297/341 |
| 2009/0050772 A1 | 2/2009 | Yamada et al. | | |

FOREIGN PATENT DOCUMENTS

| | | |
|---|---|---|
| EP | 1 431 104 A2 | 6/2004 |
| EP | 1 431 104 A3 | 6/2004 |
| JP | 2004-122825 | 4/2004 |

OTHER PUBLICATIONS

Extended Search Report issued Apr. 10, 2010 in Europe Application No. 09171653.0.
U.S. Appl. No. 12/568,919, filed Sep. 29, 2009, Kojima, et al.
U.S. Appl. No. 12/569,372, filed Sep. 29, 2009, Kojima, et al.

* cited by examiner

*Primary Examiner* — Gwendolyn Baxter
(74) *Attorney, Agent, or Firm* — Oblon, Spivak, McClelland, Maier & Neustadt, L.L.P.

(57) ABSTRACT

A vehicle seat sliding apparatus having a lower rail adapted to be fixed to a vehicle floor and an upper rail adapted to be fixed to a seat and connected to the lower rail so as to be movable with respect to the lower rail includes: a lock lever adapted to be connected rotatably to the upper rail and engaged with the lower rail for selectively the movement of the upper rail with respect to the lower rail; an operating lever adapted to be connected rotatably to a supporting bracket adapted to support the seat in the direction of rotation different from the direction of rotation of the lock lever above the lock lever; and a connecting rod adapted to be connected at one end and the other end directly to the lock lever and the operating lever respectively, and adapted to transmit an operating force to release restriction of the movement with respect to the lock lever by a pressing operation in association with the rotation of the operating lever.

7 Claims, 4 Drawing Sheets

WIDTHWISE DIRECTION

US 8,297,582 B2

VEHICLE SEAT SLIDING APPARATUS

CROSS REFERENCE TO RELATED APPLICATION

This application is based on and claims priority under 35 U.S.C. Section 119 to Japanese Patent Application No. 2008-263015 filed on Oct. 9, 2008, the entire content of which is incorporated herein by reference.

BACKGROUND OF THE INVENTION

1. Field of the Invention

The present invention relates to a vehicle seat sliding apparatus.

2. Description of the Related Art

In the related art, for example, a vehicle seat sliding apparatus as disclosed in JP-A-2004-122825 (FIG. 1 to FIG. 3) is known. This apparatus includes a lower rail (2), an upper rail (4) adapted to be connected to the lower rail so as to be movable with respect to the lower rail, and a lock lever (20) adapted to be connected rotatably to the upper rail via a bracket or the like and engaged with the lower rail for selectively restricting the movement of the upper rail with respect to the lower rail. When adjusting the position of a seat, an operating force applied to an operating lever (34) is transmitted to the lock lever via a first operating shaft (26) and a second operating shaft (28) to release the restriction of the movement by the lock lever.

In the vehicle seat sliding apparatus disclosed in JP-A-2004-122825, since the second operating shaft which presses the lock lever is required in addition to the first operating shaft which is press-fitted and fixed to the operating lever, increase in number of components is inevitable.

SUMMARY OF THE INVENTION

Thus, a need exists for a vehicle seat sliding apparatus which is not susceptible to the drawback mentioned above.

In order to solve the drawback mentioned above, a first aspect of the invention provides a vehicle seat sliding apparatus having a lower rail adapted to be fixed to a vehicle floor and an upper rail adapted to be fixed to a seat and connected to the lower rail so as to be movable with respect to the lower rail, including: a lock lever adapted to be connected rotatably to the upper rail and engaged with the lower rail for selectively restricting the movement of the upper rail with respect to the lower rail; an operating lever adapted to be connected rotatably to a supporting bracket adapted to support the seat in the direction of rotation different from the direction of rotation of the lock lever above the lock lever; and a connecting rod adapted to be connected at one end and the other end directly to the lock lever and the operating lever respectively, and adapted to transmit an operating force to release restriction of the movement with respect to the lock lever by a pressing operation in association with the rotation of the operating lever.

According to the configuration, the operating force for releasing the restriction of the relative movement can be transmitted to the lock lever in an extremely simple structure such as a pressing operation of the connecting rod in association with the rotation of the operating lever. Then, the transmission of the operating force between the operating lever and the lock lever can be achieved only by the single connecting rod, so that reduction in number of components is achieved.

DESCRIPTION OF THE PREFERRED EMBODIMENTS

Figure 1:
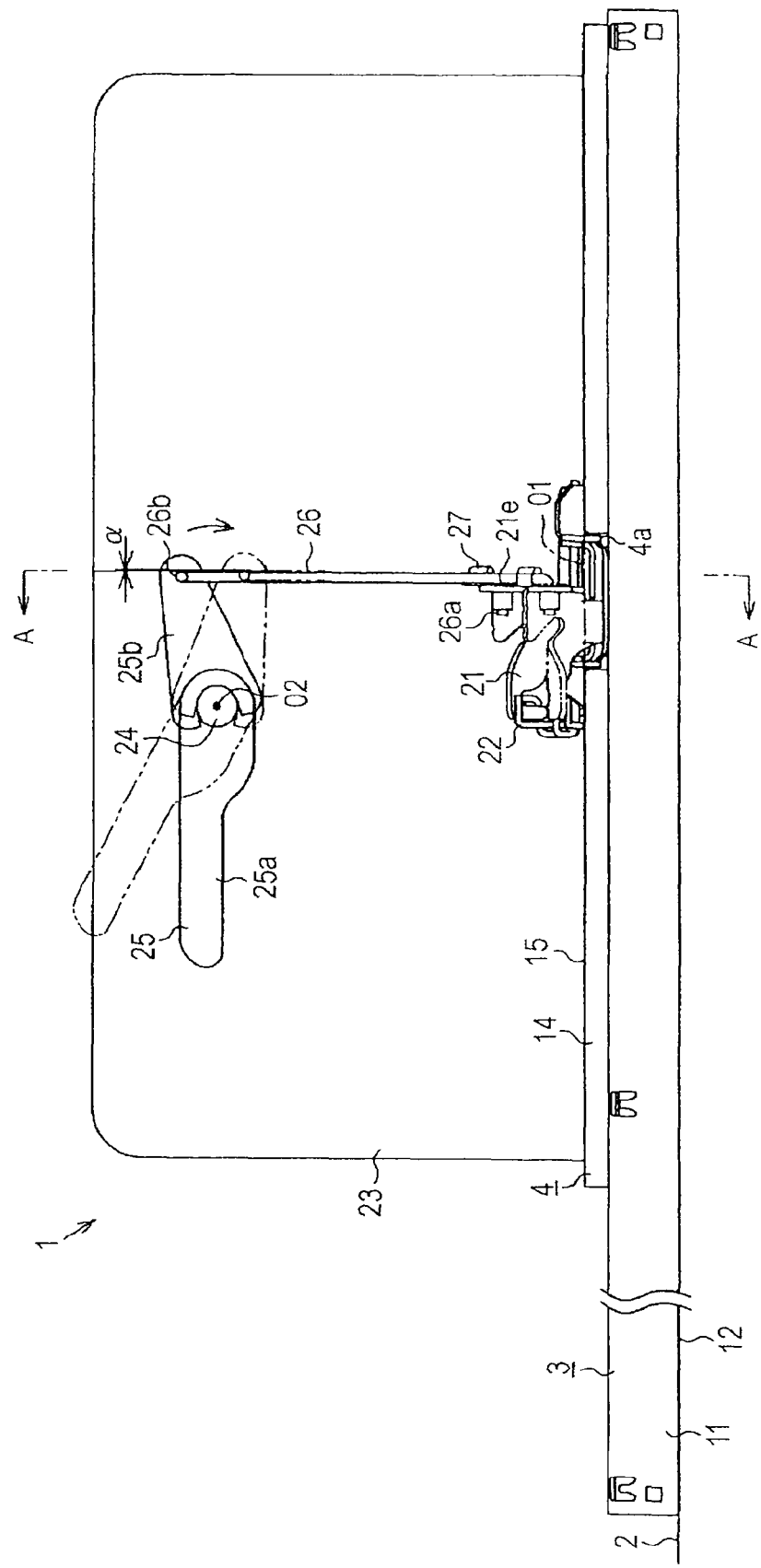
FIG. 1 is a side view showing an embodiment of the invention.

Referring now to the drawings, an embodiment in which the invention is embodied will be described below.

Figure 2:
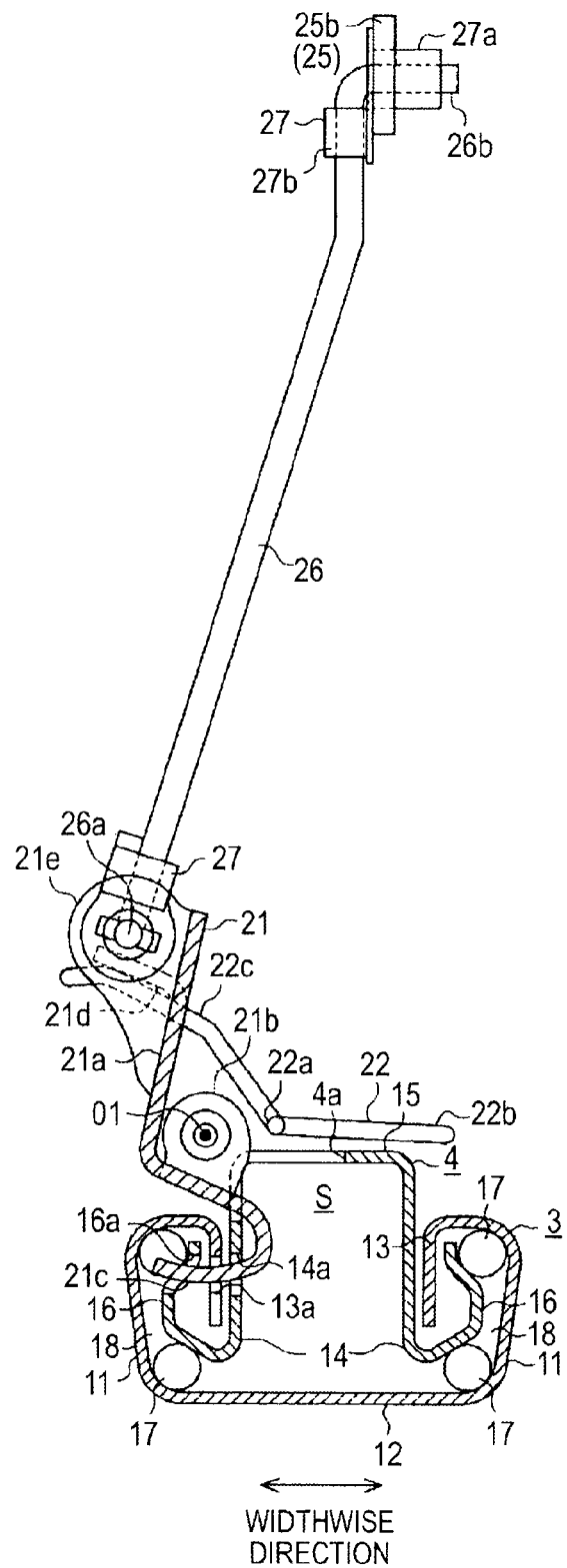
FIG. 2 is a cross-sectional view taken along the line A-A in FIG. 1.

FIG. 1 is a side view showing a vehicle seat sliding apparatus 1 according to the embodiment which is mounted on a vehicle such as an automotive vehicle, and FIG. 2 is a cross-sectional view taken along the line A-A in FIG. 1. As shown in FIG. 1, a lower rail 3 is fixed to a vehicle floor 2 in a state of extending in the fore-and-aft direction of the vehicle, and an upper rail 4 is mounted to the lower rail 3 so as to be movable relatively to the lower rail 3.

As shown in FIG. 2, the lower rail 3 includes a pair of side wall portions 11 extending upright from both ends thereof in terms of the widthwise direction and a bottom wall portion 12 connecting proximal ends (lower ends) of the side wall portions 11. Then, folded-back wall portions 13 which are formed to protrude inward in terms of the widthwise direction and then folded backward toward the proximal end sides of the side wall portions 11 are formed continuously from distal ends (upper ends) of the respective side wall portions 11.

In contrast, the upper rail 4 includes a pair of side wall portions 14 extending in the vertical direction between the both folded-back wall portions 13 of the lower rail 3 and a lid wall portion 15 connecting proximal ends (upper ends) of the side wall portions 14. Then, folded-back wall portions 16 which are formed to protrude outward in terms of the widthwise direction and then folded so as to be surrounded by the side wall portions 11 and the folded-back wall portions 13 are formed continuously from distal ends (lower ends) of the respective side wall portions 14.

In other words, the lower rail 3 and the upper rail 4 each include a U-shaped rail cross section with opening sides butted against to each other, and are held so as not to be disconnected from each other in the vertical direction mainly by the engagement of the folded-back wall portions 13 and 16. The rail cross section formed by the lower rail 3 and the upper rail 4 assumes so-called a box shape in a rectangular shape. The lower rail 3 defines an internal space S in cooperation with the upper rail 4.

Retainers 18 adapted to hold pairs of rolling elements 17 arranged in the vertical direction are mounted between the respective folded-back wall portions 16 and the side wall portions 11 opposing thereto, and the upper rail 4 is supported so as to be slidable in the longitudinal direction (the fore-and-aft direction of the vehicle) with respect to the lower rail 3 in a state of rolling the rolling elements 17 with respect to the lower rail 3.

Here, the folded-back wall portion 13 on one side of the lower rail 3 in terms of the widthwise direction (left side in FIG. 2) is formed with a plurality of lock holes 13a arranged crosswise at predetermined intervals over the substantially entire length of the longitudinal direction (the direction orthogonal to a paper plane) thereof. In contrast, a through hole 4a formed by removing a corner formed by the lid wall portion 15 and the side wall portion 14 on one side (left side in FIG. 2) in terms of the widthwise direction is formed at a center portion of the upper rail 4 in terms of the longitudinal direction, and a lower portion of the side wall portion 14 concerned is formed with a plurality of insertion holes 14a arranged crosswise at the predetermined intervals within a range of the through hole 4a in terms of the longitudinal direction and, in addition, the folded-back wall portion 16 which continues from the side wall portion 14 concerned is formed with the same number of insertion holes 16a as the insertion holes 14a arranged crosswise at the predetermined intervals. The plurality of insertion holes 14a and 16a are arranged at positions which can align with the same number of lock holes 13a on the lower rail 3 adjacent to each other in terms of the longitudinal direction so as to oppose each other in the widthwise direction.

A lock lever 21 formed of a plate member is rotatably connected to the upper rail 4 via a bracket (not shown) within the range of the through hole 9a in the longitudinal direction. The lock lever includes a body portion 21a in a substantially L-shape in cross-section and a pair of supporting strips 21b bent upward from both ends of a lower portion of the body portion 21a in terms of the longitudinal direction (the direction orthogonal to the paper plane) of the upper rail 4. The lock lever 21 is supported by the both supporting strips 21b so as to be rotatable about an axis of rotation O1 extending in the longitudinal direction of the upper rail 4 outside the internal space S. The lock lever 21 is formed with locking claws 21c formed from the body portion 21a so as to enter the interior of the internal space S through the through hole 4a and folded back outward in terms of the widthwise direction by the same number as that of the insertion holes 14a or the like at the predetermined intervals. The respective locking claws 21c are arranged so as to be inserted into and pulled out from the insertion holes 14a and 16a in association with the rotation of the lock lever 21 about the axis of rotation O1.

When the respective locking claws 21c are inserted into the lock holes 13a as well as into the insertion holes 14a and 16a, the relative movement between the lower rail 3 and the upper rail 4 is restricted. Alternatively, when the respective locking claws 21c are pulled out from the insertion holes 16a, the lock holes 13a, and the insertion holes 14a in sequence, the relative movement between the lower rail 3 and the upper rail 4 is allowed.

An upper portion of the body portion 21a is divided into in terms of the longitudinal direction of the upper rail 9, and a locking strip 21d bent outward in terms of the widthwise direction is formed on one side (inner side in the direction orthogonal to the paper plane) and an attachment 21e bent outward in terms of the widthwise direction from a distal end thereof in parallel to the supporting strip 21b is formed on the other side (near side in the direction orthogonal to the paper plane). A torsion wire 22 formed of one wire member is installed above the upper rail 4. The torsion wire 22 includes a shaft portion 22a extending in the longitudinal direction of the upper rail 4, and an end portion 22b bent from a distal end on one side of the shaft portion 22a (the inner side in the direction orthogonal to the paper plane) and locked by the upper rail 9 and, in addition, an end portion 22c bent obliquely upward from a distal end on the other side of the shaft portion 22a (the near side in the direction orthogonal to the paper plane) and locked in a state of being resiliently abutted against a lower surface of the locking strip 21d. The lock lever 21 is constantly urged in the direction of rotation on the side where the locking claws 21c is inserted into the insertion holes 14a and the like (clockwise direction in the drawing) by the single torsion wire 22. The center of torsion of the torsion wire 22 (the shaft portion 22a) is deviated from the axis of rotation O1.

As shown in FIG. 1, a supporting bracket 23 formed of a plate member extending upward from the lid wall portion 15 in a vertical wall shape is tightened to the lid wall portion 15 of the upper rail 4. The vehicle seat sliding apparatus 1 includes the supporting brackets 23 as well as the lower rails 3, the upper rails 4, and the lock levers 21 described above are provided in pair respectively in terms of the rail width direction (the direction orthogonal to the paper plane in FIG. 1), and the both supporting brackets 23 fixed to the upper rails 4 support a seat which forms a seating portion for an occupant. Therefore, when the relative movement of the upper rails 4 with respect to the lower rails 3 is restricted by the engagement between the locking claws 21c of the lock levers 21 and the lock holes 13a of the lower rails 3, the seat is held at a predetermined position with respect to the vehicle floor 2. Also, when the restriction of the relative movement is released by the release of the engagement between the locking claws 21c of the lock levers 21 and the lock holes 13a of the lower rails 3, adjustment in position of the seat with respect to the vehicle floor 2 in the longitudinal direction of the upper rails 4 (the fore-and-aft direction of the vehicle) is allowed.

The both supporting brackets 23 are provided with a pipe-shaped connecting shaft 24 extending in the rail width direction and bridging therebetween supported rotatably about an axis of rotation O2. Operating levers 25 formed of a panel member are connected to distal ends of the connecting shaft 24 which penetrate through the respective supporting brackets 23 so as to rotate integrally therewith. In other words, the direction of rotation of the operating lever 25 (the axis of rotation O2) is different from the direction of rotation of the lock lever 21 (axis of rotation O1). The operating levers 25 each include an operating portion 25a extending toward one side of the radial direction of the connecting shaft 24 (the left side in FIG. 1), and a connecting portion 25b extending toward the other side of the radial direction (the right side in FIG. 1) to a position near right above the attachment 21e.

Figures 5A, 5B:
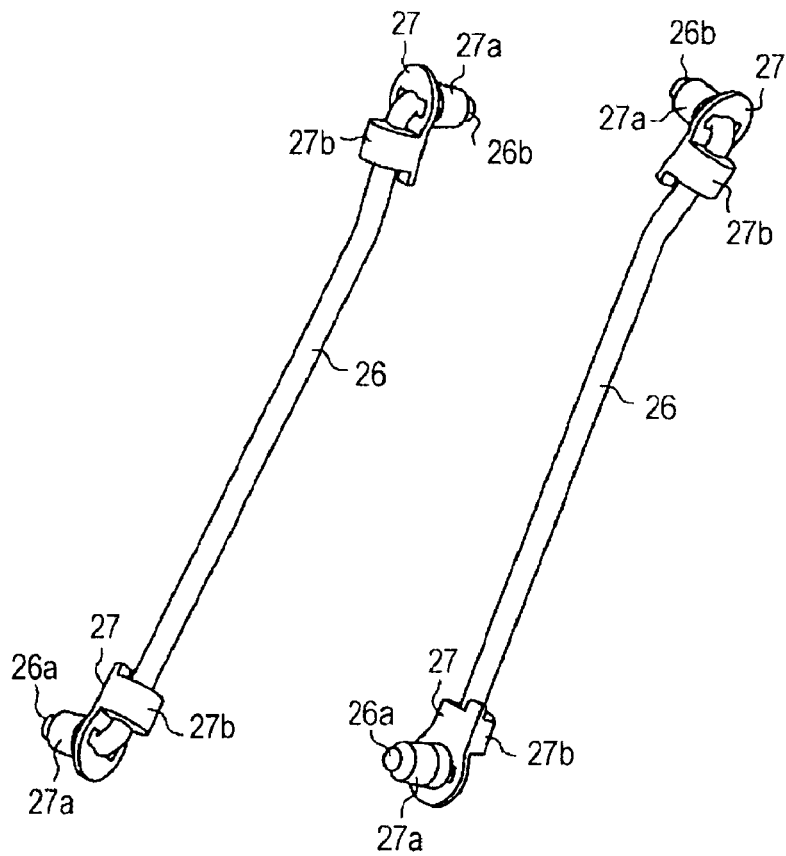
FIG. 5A is a perspective view showing a connecting rod.
FIG. 5B is a perspective view showing the connecting rod.

Then, a round-rod shaped connecting rod 26 is connected to the attachment 21e and the connecting portion 25b so as to extend therebetween. In other words, an end portion 26a on one side of the connecting rod 26 is bent in the longitudinal direction of the upper rail 4 and is inserted through and connected directly to the attachment 21e. In contrast, an end portion 26b on the other side of the connecting rod 26 is bent in the widthwise direction (the direction in which the connecting shaft 24 extends) of the upper rail 4 and is inserted through and connected directly to the connecting portion 25b. A resin-made clip 27 as a covering member is mounted on the end portion 26a of the connecting rod 26. As shown in the perspective views in FIGS. 5A and 5B, the clip 27 includes a cylindrical covering portion 27a in which the end portion 26a is press-fitted, and a hook-shaped holding portion 27b adapted to lock the connecting rod 26 in the vicinity of the end portion 26a. Therefore, the clip 27 prevents the end portion 26a from coming into direct contact with a connecting portion of the attachment 21e at the covering portion 27a and also prevents the same from being disconnected from the connecting rod 26 at the holding portion 27b. Likewise, the clip 27 is also mounted on the end portion 26b of the connecting rod 26.

Figure 3:
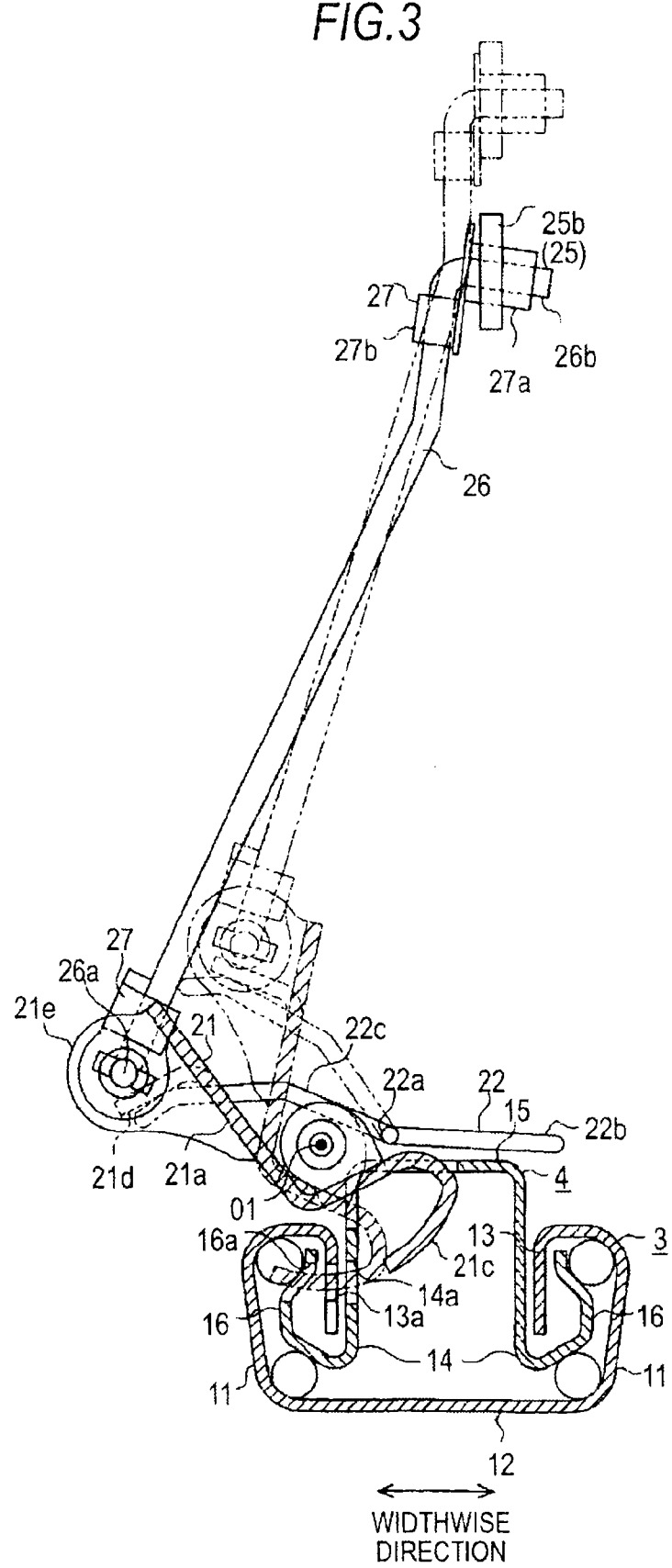
FIG. 3 is a cross-sectional view showing an operation of the same embodiment.

In this configuration, it is assumed that the operating portion 25a of the operating lever 25 is operated, and the operating lever 25 (the connecting portion 25b) is rotated clockwise about the axis of rotation O2 in FIG. 1. As described above, by the rotation of one of the pair of operating levers 25, the other operating lever 25 is rotated simultaneously via the connecting shaft 24. At this time, by the rotation of the connecting portion 25b so as to move downward, the connecting rod 26 presses the lock lever 21 directly in a state of causing the end portion 26a (and the attachment 21e) to be displaced outward in the rail width direction as shown in FIG. 3. In this case, the connecting rod 26 tilts by a very minute angle of inclination a in the longitudinal direction of the upper rail 4 about the attachment 21e (the end portion 26a) side (see FIG. 1). Also, the connecting rod 26 tilts by an angle of inclination p in the rail width direction about the connecting portion 25b (end portion 26b) side (see FIG. 3). Accordingly, the each lock lever 21 is rotated counterclockwise about the axis of rotation O1, that is, in the direction of rotation in which the locking claws 21c are moved away from the insertion holes 14a or the like against an urging force of the torsion wire 22. Accordingly, the restriction of the relative movement between the lower rail 3 and the upper rail 4 is released. The clips 27 (covering portions 27a) mounted on both end portions 26a and 26b of the connecting rod 26 generate torsion in cooperation with the connecting rod 26 when pressing the connecting rod 26 in association with the rotation of the operating lever 25. Accordingly, an amount of deformation of the torsion of the connecting rod 26 is slightly restrained. Simultaneously, the clip 27 (the covering portion 27a) restrains rattling of the connecting rod 26 (the end portions 26a and 26b) at the attachment 21e or the connecting portion 25b.

Figure 4:
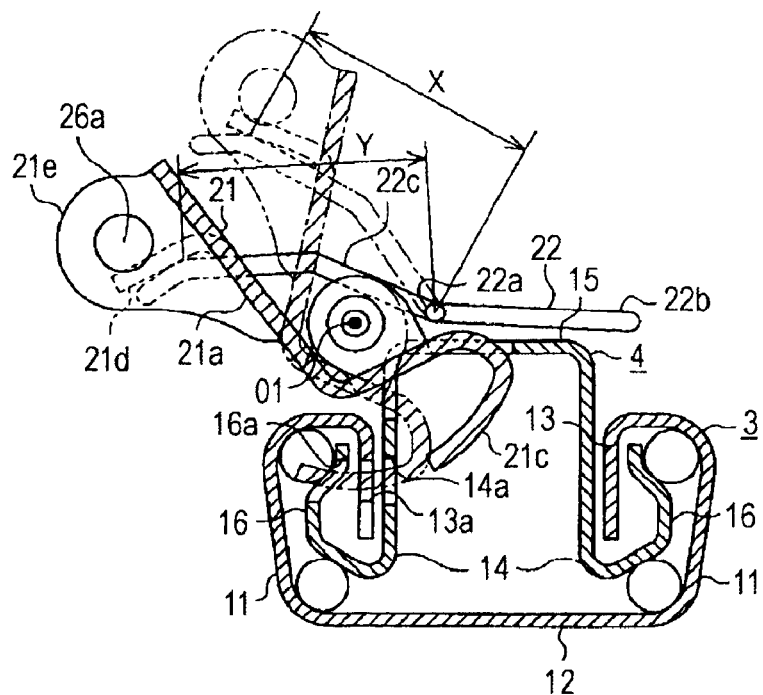
FIG. 4 is a cross-sectional view showing an operation of the same embodiment.

In this embodiment, the center of the torsion of the torsion wire 22 (the shaft portion 22a) is deviated from the axis of rotation O1 of the lock lever 21. Therefore, as shown in FIG. 4, the end portion 22c of the torsion wire 22 slides on the locking strip 21d in association with the rotation of the lock lever 21 about the axis of rotation O1. In other words, when the distances from the shaft portion 22a to working points where the end portion 22c applies the urging force to the locking strip 21d when the lock lever 21 is located respectively at a rotational position where the locking claws 21c and the lock holes 13a engage with each other and at a rotational position where the engagement is released from each other are expressed by the distances X, Y, a relationship "X≠Y" is established. In particular, the end portion 22c is formed at a terminal end thereof so as to come into line contact with the lower surface of the locking strip 21d when the lock lever 21 is located at the rotational position where the locking claws 21c and the lock holes 13a engage with each other.

As described above in detail, the following advantages are achieved according to this embodiment.

(1) In this embodiment, an operating force for releasing the restriction of the relative movement between the lower rail 3 and the upper rail 9 can be transmitted to the lock lever 21 in an extremely simple structure such as a pressing operation of the connecting rod 26 in association with the rotation of the operating lever 25. Then, the transmission of the operating force between the operating lever 25 and the lock lever 21 can be achieved only by the single connecting rod 26, so that reduction in number of components is achieved. Also, even though the direction of rotation of the lock lever 21 and the direction of rotation of the operating lever 25 are different from each other, the operating lever 25 (the connecting portion 25b) is arranged above the lock lever 21. Then, the axis of rotation O1 of the lock lever 21 extends in the longitudinal direction of the upper rail 4, and the axis of rotation O2 of the operating lever 25 extends in the widthwise direction of the upper rail 4. Therefore, at the time of the pressing operation of the connecting rod 26 in association with the rotation of the operating lever 25, the angle of inclination a is restrained to a very minute angle and the connecting portion between the operating lever 25 and the connecting rod 26 is prevented from being displaced in the longitudinal direction of the upper rail 4.

(2) In this embodiment, at the time of pressing operation of the connecting rod 26 in association with the rotation of the operating lever 25, the amount of deformation of the torsion of the connecting rod 26 can be restrained by the clips 27, and hence a space required for installing the connecting rod 26 can be reduced.

(3) In this embodiment, by the rotation of one of the pair of operating levers 25, the other one of the pair of operating levers can be rotated simultaneously via the connecting shaft 24 synchronously, so that the operating force for releasing the restriction of movement can be transmitted simultaneously to the both of the pair of lock levers 21.

The embodiment described above may be modified as follows. In the embodiment as described above, the supporting bracket 23 does not have to be provided upward from the upper rail 4 as long as it supports the seat.

In the embodiment described above, the number of locking claws 21c to be provided on the lock lever 21 may be any number as long as there is at least one.

In the embodiment described above, the cross-sectional shape of the lower rail 3 is shown simply as an example. For example, the folded-back wall portions 13 may be protruded outward in terms of the rail widthwise direction.

In the embodiment described above, the cross-sectional shape of the upper rail 4 is shown simply as an example. For example, the folded-back wall portions 16 may be protruded inward in terms of the rail widthwise direction. The rail cross section of the upper rail 4 is not limited to the U-shape, but may be an inverted T-shape.

The direction of movement of the seat in association with the movement of upper rail 4 with respect to the lower rail 3 may be, for example, the fore-and-aft direction or the widthwise direction of the vehicle.

Subsequently, a technical idea understood from the embodiment and other examples described above will be added below.

The vehicle seat sliding apparatus according to the invention, wherein
the axis of rotation of the lock lever extends in the longitudinal direction of the upper rail; and
the axis of rotation of the operating lever extends in the widthwise direction of the upper rail.

According to one embodiment of the invention, the amount of deformation of the torsion of the connecting rod can be restrained by the covering member, and hence a space required for installing the connecting rod can be reduced.

According to one embodiment of the invention, by the rotation of one of the pair of operating levers, the other one of the pair of operating levers can be rotated simultaneously via the connecting shaft synchronously, so that the operating force for releasing the restriction of movement can be transmitted simultaneously to the both of the pair of lock levers.

According to one embodiment of the invention, the vehicle seat sliding apparatus in which the operating force for releasing the restriction of movement of the upper rail with respect to the lower rail can be transmitted to the lock lever without increasing the number of components is provided.

What is claimed is:
1. A vehicle seat sliding apparatus having a lower rail adapted to be fixed to a vehicle floor and an upper rail adapted to be fixed to a seat and connected to the lower rail so as to be movable with respect to the lower rail, comprising:
- a lock lever connected rotatably to the upper rail and engaged with the lower rail to selectively restrict movement of the upper rail with respect to the lower rail;
- a supporting bracket that supports the seat;
- an operating lever connected rotatably to the supporting bracket in a direction of rotation different from a direction of rotation of the lock lever; and
- a connecting rod connected at a first end to the operating lever and connected at a second end to the lock lever,
- wherein the connecting rod transmits an operating force to release restriction of the movement with respect to the lock lever by a pressing operation in association with the rotation of the operating lever, and
- wherein the lock lever is a continuous plate member.

2. The vehicle seat sliding apparatus according to claim 1, wherein
- a covering member to restrain amount of deformation of torsion of the connecting rod at the time of the pressing operation of the connecting rod in association with the rotation of the operating lever is mounted on at least one of the first end and the second end of the connecting rod.

3. The vehicle seat sliding apparatus according to claim 2, wherein the operating lever is a first operating lever,
- wherein the seat sliding apparatus further includes a second operating lever, and
- wherein the first operating lever and the second operating lever are connected to a connecting shaft that is between the first operating lever and the second operating lever so that that the first operating lever and the second operating lever rotate integrally.

4. The vehicle seat sliding apparatus according to claim 2, wherein the covering member includes a cylindrical covering portion that is fit to the connecting rod between the connecting rod and the operating lever.

5. The vehicle seat sliding apparatus according to claim 1, wherein the operating lever is a first operating lever,
- wherein the seat sliding apparatus further includes a second operating lever, and
- wherein the first operating lever and the second operating lever are connected to a connecting shaft that is between the first operating lever and the second operating lever so that that the first operating lever and the second operating lever rotate integrally.

6. The vehicle seat sliding apparatus according to claim 1, wherein the lock lever includes:
- a body portion,
- a pair of supporting strips that extend upward from the body portion, the lock lever being connected rotatably to the upper rail at the supporting strips, and
- an attachment portion that extends from the body portion and are parallel to the supporting strips, the lock lever being connected rotatably to the second end of the connecting rod at attachment portion.

7. The vehicle seat sliding apparatus according to claim 6, wherein the upper rail includes a plurality of first insertion holes and the lower rail includes a plurality of second insertion holes, and
- wherein the lock lever includes locking claws that extend from the body portion, the locking claws are configured to be inserted into and withdrawn from the first insertion holes and the second insertion holes by rotation of the locking lever.

* * * * *